United States Patent [19]
Anthony et al.

[11] 3,831,621
[45] Aug. 27, 1974

[54] ROTARY SLIDE VALVE

[75] Inventors: Robert C. Anthony, White Bear Lake; Donald W. Byland, St. Paul, both of Minn.

[73] Assignee: Union Brass and Metal Manufacturing Company, St. Paul, Minn.

[22] Filed: Nov. 19, 1973

[21] Appl. No.: 417,369

[52] U.S. Cl.......... 137/270, 137/625.31, 137/454.6, 251/316, 251/288
[51] Int. Cl............................................ F16k 11/06
[58] Field of Search............ 137/270, 454.6, 625.17, 137/625.14, 625.31, 329.02, 315, 625.32; 251/304, 314, 316, 286, 288, 84, 88, 181

[56] References Cited
UNITED STATES PATENTS

| | | | |
|---|---|---|---|
| 1,223,353 | 4/1917 | Angell | 251/304 X |
| 1,364,059 | 12/1920 | Jones | 251/304 |
| 1,807,490 | 5/1931 | Milner | 251/286 X |
| 3,207,181 | 9/1965 | Willis | 137/625.31 |
| 3,331,396 | 7/1967 | Willis | 137/625.31 |
| 3,788,601 | 1/1974 | Schmitt | 251/304 |

Primary Examiner—William R. Cline
Assistant Examiner—Robert J. Miller
Attorney, Agent, or Firm—Frederick A. Fleming

[57] ABSTRACT

Ceramic disks, rotor and stator, each with two apertures located symmetrically in opposite quadrants and each having one optically flat surface in contact at an interface, are combined with associated elements within a cylindrical cartridge, the stator sealed to the open end of the cartridge, the rotor subject to rotation in the claws of a clutch driven by a control shaft sealed through the opposite closed end of the cylinder and by means of which the rotor may be turned to align the apertures, opening a passageway through the interface, or rotated 90° from that position to close the passageway. Ports in the cylinder wall adjacent to the rotor provide exit passage from the cylinder. A limit washer with two lugs is keyed to the control shaft and limits rotation to one quarter turn, 90°, by interference of the lugs with two stops on the closed end of the cartridge. The keys are 45° removed from the lugs on the limit washer; consequently a "left-hand" valve is convertible to a "right-hand" valve (and vice versa) by turning the limit washer face over face.

2 Claims, 4 Drawing Figures

PATENTED AUG 27 1974 3,831,621

3,831,621

ROTARY SLIDE VALVE

BACKGROUND OF THE INVENTION

1. Field of the Invention

This invention relates to means for regulating flow through a passage, in which a valve head only rotates about its axis and has a flow passage through it when apertures in a rotary circular disk are turned into positions opposite apertures in a stationary surface, the valve having quarter turn action as restricted by a limit stop.

2. Description of the Prior Art

The patent literature reveals a rich legacy of rotary slide valves, including the stopcock of Joseph Breeden, U.S. Pat. No. 100,113, Feb. 22, 1870 and the valve of Oscar P. Monson, U.S. Pat. No. 2,583,869, Jan. 29, 1952. Such valves require a quarter turn limit stop such as that illustrated in the valves of G. Baker, U.S. Pat. No. 86,268, Jan. 26, 1869, of the pin and cam race type which is also used on the Monson valve cited above.

The problems associated with the prior art are the following:

The surfaces of the valving elements must be finished perfectly flat, to prevent leakage between the interface.

The valving surfaces, a stationary surface and a rotary surface, must be urged together with a force sufficient to overcome the tendency of the surfaces to separate under the rotary action and the internal pressure of the controlled fluid.

The rotary member of the valve must be provided with a limit stop to afford the operator with a ready means for turning to the open and closed positions: Since it is desirable and customary to provide that some valves open with a clockwise turn (e.g., cold water) and that other valves open with a counterclockwise turn (e.g., hot water), the inventory is complicated by the requirement to maintain each type in stock since heretofore the types were not interconvertible.

SUMMARY OF THE INVENTION

The primary object of the invention is to provide a superior quarter turn valve which is competitive in the marketplace. Recognizing that the use of molded ceramic parts for the rotor and stator of such a valve would afford precision parts having the desired degree of flatness and hardness, a secondary object developed, to invent the means to incorporate such ceramics into such a valve. A further object was to provide a valve which can be converted from right-hand operation to left-hand operation, or vice versa by means of a simple adjustment requiring no special tools or additional parts.

The invention is a pair of ceramic bodies, typically disks, in contact on a mutual flat interface, supported to stand in the path of flow of a controlled fluid within a valve body, one ceramic element, the stator, supported sealably over the inlet and the other ceramic element, the rotor disk, being controlled in sliding rotation relative to the stator surface by a clutch, the clutch drivable by a control shaft which penetrates and is sealed to the body; both disks are divided into four quadrants; apertures penetrate two opposite quadrants in each disk; the apertures may be aligned to open a flow path, or turned 90° to close the path, the solid quadrants of the rotor occulting the apertures of the stator; associated resilient structures (a rubber "0" ring and a plastic clutch) urge the surfaces of stator and rotor upon one another, preventing leakage through the interface. Rotation of the rotor is limited to one quarter turn (90°) by interference of lugs attached to the control shaft against stops attached to the valve body. The lugs are associated with a limit washer which is keyed to the control shaft. Inverting the position of the limit washer on the control shaft converts the valve from right-hand to left-hand action or vice versa. All the elements serving these functions are combined within a valve cartridge which is replaceable as a single unit.

The valve cartridge of this invention has several advantages over the prior art. Use of ceramic valve elements materially improves the economics of rotary slide valve manufacture, making it possible to introduce this feature into competitive merchandise. Valve function has been achieved inside a compact cylinder, providing the designer with new opportunities to create appealing and marketable fixtures. The ceramic valving surfaces are endurable for the lifetime of the valve, eliminating the need for replacement of parts such as the common faucet washer. If such a valve is damaged, it is simply replaced by a single new valve cartridge unit. Interconvertibility of right-hand and left-hand valves by simply inverting the limit washer simplifies inventories throughout the distribution chain and simplifies the repair of damaged valves.

DESCRIPTION OF THE PREFERRED EMBODIMENT

Figure 1:
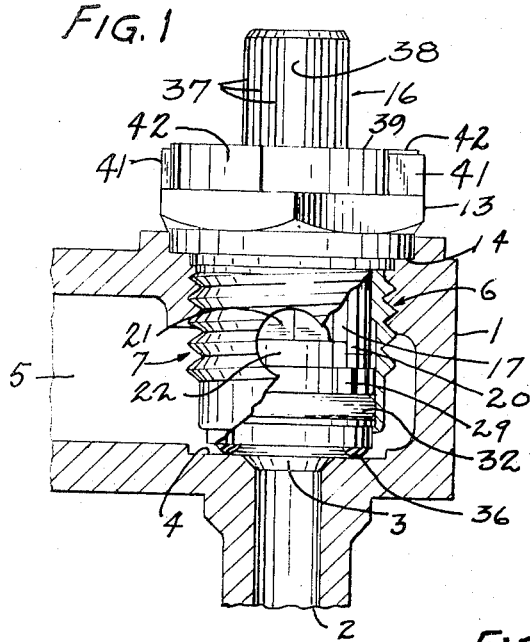
FIG. 1 is an elevational view of the valve cartridge inserted in a faucet housing. Parts of the valve cartridge are broken away to show the enclosed components. Valve is shown in the "open" position.

This invention is a valve cartridge 7 for use with a fluid control device, e.g., a faucet, (FIG. 1) having a hollow housing 1, an inlet tube 2 which joins the housing at an internal aperture 3, a flat circular face 4 on the internal surface of the housing 1 immediately surrounding the internal aperture 3, an outlet duct 5 leading away from the housing 1 at substantially a right angle from the inlet tube 2; a threaded circular opening 6 in the housing coaxial with and opposite to the flat circular face 4, a substantially cylindrical valve cartridge 7 inserted into and sealably closing the threaded circular opening 6 with a threaded outside diameter 8 (FIG. 2), and a circular end 9 which is positionable against the flat circular face 4.

The valve cartridge 7 (FIGS. 1–4) is an assembly of elements within a substantially cylindrical shell 10. Functionally, the valve action is that of a quarter-turn rotary slide valve. The circular end 9 of the valve cartridge 7 is sealably thrust upon the circular flat face 4 surrounding the internal aperture 3 and it therefore serves to plug the internal aperture 3 so long as the valving elements within the valve cartridge 7 are in the closed position. When the valving elements are in the open position (cf. FIG. 3) a path is established through the circular end 9 of the valve cartridge 7 and out through ports 11 in the cylindrical shell 10, providing a passage from the inlet tube 2 to the outlet duct 5.

Figure 2:
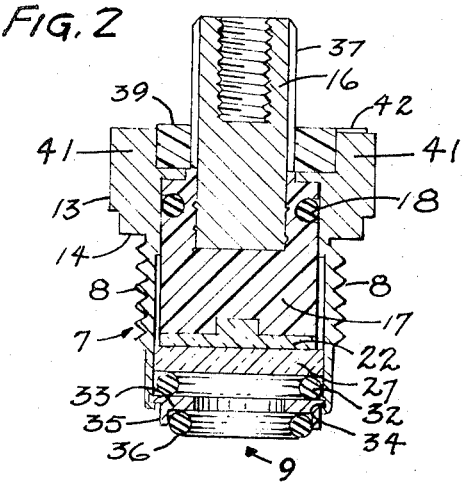
FIG. 2 is a sectional view of the valve cartridge positioned as in FIG. 1, with the valve in the "open" position.

The cylindrical shell 10 has an external flat hexagonal end 12 located in a plane normal to the cylinder axis; the outline of the exterior end surface is hexagonal because the adjacent stock is machined to provide a hex nut 13 configuration (FIGS. 1, 4) for turning the threaded exterior body of the cylindrical shell 10 into the threaded interior of the opening 6 in the housing 1 (FIG. 1). A shoulder 14 adjacent to the hex nut 13 limits the extreme insertion of the valve cartridge 7 into the threaded circular opening 6, and participates in sealing the valve cartridge 7 to the housing 1.

A circular aperture 15 (FIGS. 2, 3) is centered on the hexagonal end 12 of the cylindrical shell 10 and accommodates a control shaft 16 which extends therethrough.

Within the cylindrical shell 10 the control shaft 16 is fixed coaxially in the cylindrical body of a clutch 17, to control the rotational position thereof. A first rubber "O" ring 18 is adapted to an annular groove 19 on the circumference of the clutch 17, to fill the annular space between the clutch 17 and the cylindrical shell 10 and sealing against leakage.

The face of the clutch 17 has a pair of segment shaped claws 20 arranged diametrically opposed within one pair of quadrants and a pair of channels 21 arranged diametrically opposed within the other pair of quadrants.

Figure 3:
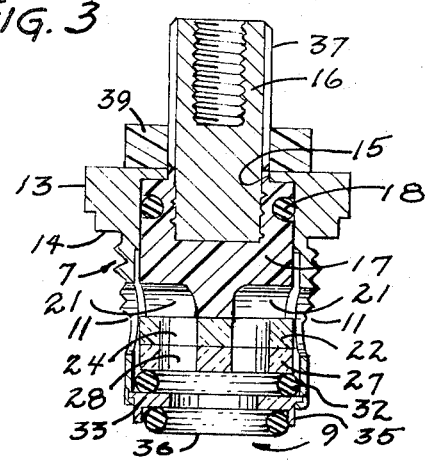
FIG. 3 is a sectional view of the valve cartridge taken at right angles to the view depicted in FIG. 1 and FIG. 2, with the valve in the "open" position.
Figure 4:
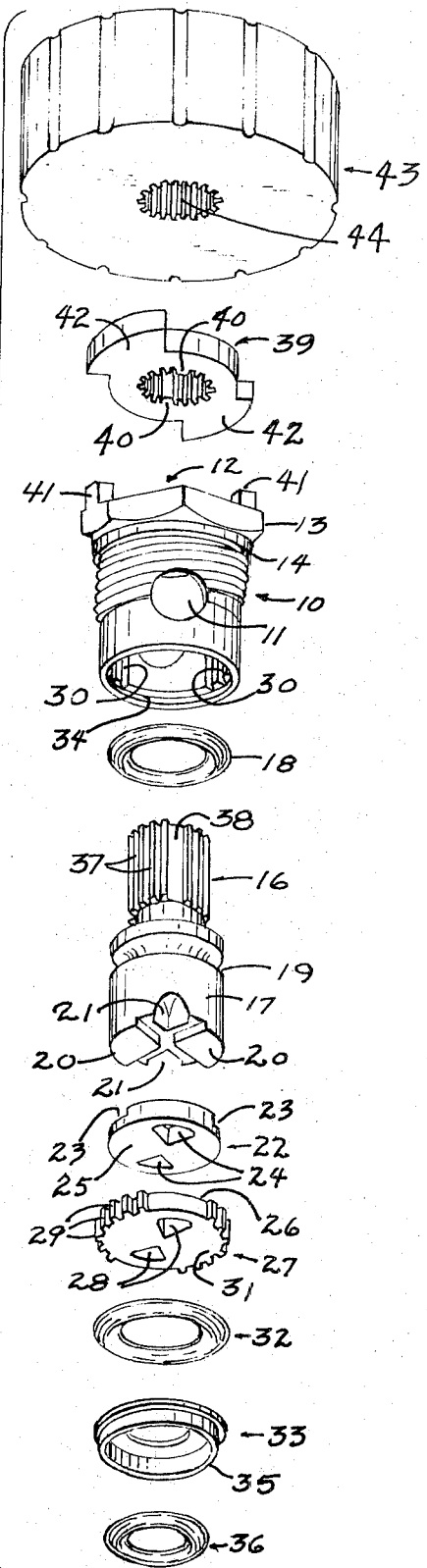
FIG. 4 is an exploded view of the parts making up the valve cartridge, together with a handle.

A rotor disk 22 (FIGS. 1–4) is positionable adjacent to the face of the clutch 17. The clutched side of the rotor disk 22 has a pair of segmentshaped notches 23 (FIG. 4) located within one pair of opposite quadrants. The notches 23 conformably receive the claws 20 of the clutch face and transmit rotary action from the clutch 17 to the rotor disk 22. Extending through the rotor disk 22 and symmetrically located within the other set of quadrants are two apertures 24 which participate in the flow path. The opposite (away from clutch 17) side of the rotor disk 22 is the rotor slide surface 25, which is finished optically flat for participation in the slide valving action. As the rotor disk 22 is positioned on the face of the clutch 17, notch 23 to claw 20, the channels 21 stand adajcent to the apertures 24 in the rotor disk 22 (FIG. 3).

In interfacial contact with the rotor slide surface 25 is the optically flat stator slide surface 26 of a stator disk 27. The stator disk 27 has a pair of symmetrically disposed apertures 28 located within a pair of opposite quadrants, which apertures 28 are capable of alignment with the corresponding apertures 24 of the rotor disk 22 by rotation of the rotor disk 22 to provide an open path through the two disks, but if the rotor disk 22 is turned one quarter turn from that position the apertures are mutually occulted by the solid quadrant areas and the path is closed.

The stator disk 27 has a perimetrical gear-like teeth 29, arranged in two equal sets, one set at the outer edge of each solid quadrant. The teeth 29 engage corresponding sets of grooves 30 (FIG. 4) located on the interior surface of the cylindrical shell 10, thereby fixing the position of the stator disk 27 within the cartridge 7, while affording positional tolerance in the direction of the cartridge axis.

A flat annular area 31 is present on the outside surface of the stator disk 27.

A second rubber "O" ring 32 (FIGS. 1-4) is positionable upon the outside surface of the stator disk 27, to seal against the flat annular area 31 of the stator disk 27 above and against a washer 33 below. The washer 33 inserts into a circular recess 34 in the end of the cylinder shell 10 and is positioned upon the shoulder of that recess.

The washer 33 is fixed in position in the circular recess 34 by inwardly crimping (spinning) the extreme end of the maleable (typically brass) cylinder shell 10 upon the circumference of the washer. As the washer 33 is urged into its seat in the circular recess 34 by the crimping force, the second rubber "O" ring 32 is placed under compression, establishing a seal between the outward surface of the stator disk 27 and the washer 33.

Compression of the second rubber "O" ring 32 also serves to establish the preload compressive force on the stator disk 27 and rotor disk 22 to assure against leakage of the controlled fluid across the interface between the rotor slide surface 25 and the stator slide surface 26.

Integral with the washer 33 on its outward surface is a short concentric bushing 35 which has an inside diameter to receive by press fitting a third rubber "O" ring 36. The height of the bushing 35 is less than the web diameter of the third rubber "O" ring 36. The third rubber "O" ring 36 has a working diameter greater than the internal aperture 3 (FIG. 1) and when the cartridge is threaded into the external circular opening 6 the third rubber "O" ring 36 is compressed between the flat circular surface 4 of the housing 1 and the surface of the washer 33; the inside circumference of the bushing 35 provides lateral support against expansion of the third rubber "O" ring 36 due to the pressure of the controlled fluid.

The rotor- and stator disks (22, 27) are manufactured from porcelain ceramic by modern techniques which inexpensively afford slide surfaces of extreme precision, having "optical flatness" to a few wavelengths of light. To make use of these desirable characteristics of the ceramic parts, it was necessary to overcome the disadvantage common to ceramics--brittleness. We accomplished this by supporting the ceramic parts between resilient structures, the clutch face 17 of Celcon (Trademark Registered to Celanese Corporation, Newark, N.J.) polyformaldehyde polymer and the second rubber "O" ring 32 of Neoprene (Trademark Registered to E. I. duPont de Nemours & Co., Wilmington, Delaware) cloroprene rubber. The mounting is resilient, yielding to slight variations in the fit of the face of the clutch 17 to the rotor disk 22 through provision of adequate tolerances in the fit of the claws 20 to the notches 23, and affording latitude in the positioning of the stator disk 27.

The engagement of the clutch claws 20 to the rotor notches 23 is distributed over the considerable collective surface of the shoulders of the notches. Forces holding the stator disk 27 in the cylindrical shell 10 are distributed over the many gear-like teeth 30 arranged adjacent to the strongest area (the solid quadrants) of the stator disk 27.

When completely assembled, the cartridge is very compact (cf. FIG. 1), standing about one inch in height and three-fourth inch in diameter.

As described to this point, the valve of this invention permits unlimited rotation of the control shaft 16 in either clockwise or counterclockwise direction, with two "closed" positions for each full 360° turn.

For use in lavatory fixtures, it is desirable to provide the valve cartridge 7 with limiting means, to restrict rotation to one quarter turn, with open and closed positions at the limiting positions. It is also desirable to provide the option of installing the valve as a cold water valve opening by a clockwise turn or as a hot water valve, opening by a counterclockwise turn, as described below.

The control shaft 16 is splined, having an even number of equal longitudinal grooves and ridges 37 on its exterior cylindrical surface, except that two of the ridges, one each on diametrically opposite sides of the valve shaft are absent, thereby affording two large grooves, the index grooves 38.

A limit washer 39 is positionable upon the control shaft 16 to limit rotation of the shaft to one quarter turn (90°). The limit washer 39 has an internal cylindrical surface formed with ridges and grooves which conform with the grooves and ridges of the splined control shaft 16, including two diametrically opposite large ridges, the index keys 40 which fit conformably into the two index grooves 38 of the splined control shaft 16.

The outer diameter of the limit washer 39 is approximately two-thirds the minor dimension of the hexagonal end 12 of the valve cartridge 7.

Fixed on the surface of the hexagonal end 12 are two equal projections such as the stops 41, of height comparable to the thickness of the limit washer 39. The stops 41 stand immediately outside of the circumference of the limit washer 39 as positioned on the control shaft 16.

An imaginary plane passed through the axis of the control shaft 16 and through the midpoints of the stops 41 intersects the stator disk 27 in a line which lays 90° from the line joining the apertures 28 of the stator disk 27.

In the plane of the limit washer 39 and extending from its circumference equally and symmetrically are two equal lugs 42.

The limit washer 39 is positioned on the control shaft 16 so as to contact the surface of the hexagonal end 12 of the valve cartridge 7, with the lugs 42 accommodated between the stops 41.

Keyed to the control shaft 16, the limit washer 39 rotates concertedly with the control shaft 16, and rotation of the control shaft 16 is therefore limited by interference of the lugs 42 against the stops 41.

The sum of the angles included by imaginary lines drawn from the axis of the control shaft 16 and subtending the individual lugs 42 and stops 41 is 180°. Each lug 42 may sweep through one half of the remaining 180°, limiting the angular travel of the control shaft 16° to 90°, one quarter turn.

A first imaginary line may be drawn through the center of the limit washer 39 passing through the radial midline of the lugs 42. A second imaginary line may be drawn through the center of the limit washer 39 passing through the midpoint of the index keys 40. The angle between these two imaginary lines is here set at 45°, to provide for convertibility as discussed below.

Since the index grooves 38 on the control shaft 16 lie in a common axial plane with the apertures 24 of the rotor disk 22, and the stops 41 lie in second axial plane that is 90° removed from the apertures 28 in the stator disk 27, it follows that if the control shaft 16 is rotated to abutt the lugs 42 against the stops 41, the valve is either fully open or fully closed, since the apertures 24 will then be either aligned with the apertures 28, opening a passage, or 90° from alignment, blocking the passage.

The status of a valve cartridge 7 is apparent from inspection of the hexagonal end 12: when the index grooves 38 are radially adjacent to the stops 41, the valve is closed.

By his experience with conventional screw drive compression faucets, the consumer is conditioned to expect the cold water faucet (which by convention is located on the right-hand side of the lavatory) to open in response to a clockwise torque (served by a left-hand screw) and the hot water faucet to open in response to a counterclockwise torque (served by a right-hand screw).

"Left-hand" action (cold water) or "right-hand" action (hot water) may be obtained by the choice of one or the other face of the limit washer 39 to be outward of the valve cartridge 7. Turning the limit washer 39 face over face has the effect of converting the limit washer 39 into its mirror image, changing the index key 40 to lug 42 relationship by 90° and converting the action of the valve. The illustrations (FIGS. 1–4) depict the valve with a limit washer 39 positioned for "left hand" (cold water) action and with the control shaft 16 rotated to the open position.

A handle 43 may be attached to the control shaft 16 after the limit washer has been installed, fitting the end of the control shaft 16 into a centered socket 44 having a complete set of longitudinal grooves (but no index), thereby providing for adjustment of any legend or art work present on the handle 43 with respect to the fixture with which it is associated.

I claim:

1. I claim a cartridge valve adapted for use within a faucet housing having an inlet duct associated with an internal aperture bounded by a flat circular face, an outlet duct, and a threaded circular opening opposite to and parallel with the flat circular face, comprising the combination of the following mechanical elements:

a cylindrical shell having an open circular inlet end, outlet ports penetrating the cylinder wall and a closed end opposite the inlet end;

a control shaft passing through a circular aperture centered in the closed end of the said cylindrical shell;

a cylindrical clutch, fixedly joined on axis with said control shaft;

a first rubber "0" ring in an annular groove on said clutch, to seal the closed end of said cylinder shell to said clutch;

the circular face of said clutch being divisible into two pairs of opposite quadrants, one pair of quadrants having projecting claws and the other pair of quadrants having channels directed laterally and positionable adjacent to the outlet ports of said cylindrical shell by rotation of said control shaft;

a ceramic rotor disk of circular diameter equal to that of the circular face of said clutch, said rotor disk having notches in one pair of opposite quadrants, the notches adapted to receive the claws of said clutch, coupling said rotor disk to said clutch for rotation, said rotor disk having an opposite flat face; said rotor disk having an aperture in each of the other pair of quadrants, the apertures penetrating said rotor disk normal to the flat face and symmetrically arranged within the quadrants;

a ceramic stator disk, having a flat face adjacent to the flat face of said rotor disk, said stator disk having apertures like those of said rotor disk, the apertures being superpositionable by rotation of said rotor disk, to afford a passageway therethrough; said stator disk having gear teeth arranged in two sets on its perimeter, each set of teeth outward of the solid areas of said stator disk;

the gear teeth of said stator disk being engaged in corresponding longitudinal grooves found in the internal cylindrical surface of said cylindrical shell and serving to fix said stator disk against rotation relative to said cylindrical shell;

a second rubber "0" ring, in juxtaposition to the opposite face of said stator disk, contacting an outer annular area of said stator disk and sealing therewith;

a washer, sealing against said second "0" ring, fitting into a circular recess in the end of said circular shell and compressively fastened upon said second rubber "0" ring by the rolled edge of the open circular end of said cylindrical shell, the compression of the second rubber "0" ring serving to seal the said stator disk to the circular end of said cylindrical shell and to provide a compressive force, urging the said stator disk against the said rotor disk;

a bushing, fixed concentrically upon the face of said washer;

a third rubber "0" ring, positionable against said washer and within said bushing, having a height greater than the height of said bushing, and serving to seal the open end of said cylindrical shell against the flat circular face around the internal aperture of the faucet housing referred to in the preamble;

wherein rotation of said control shaft relative to said cylindrical shell actuates rotation of said rotary disk relative to said stationary disk, causing the apertures of said rotary disk to coincide with the apertures of said stator disk twice for each 360° rotation, which function may be adapted to quarter turn valve operation by the addition of a limit stop.

2. A cartridge valve as in claim 1, provided with a convertible quarter turn limit stop, comprising:

a pair of longitudinal index grooves on opposite sides of said control shaft, said index grooves being intersected by an axial plane which includes the centers of the apertures of said rotor disk which is coupled to said control shaft through said clutch;

a limit washer having an inner diameter to fit on said control shaft, a pair of index keys arranged longitudinally on the inside cylindrical surface of said limit washer, said index keys being intersected through their long dimension by a plane passing through the axis of said limit washer, the common key plane, the shape of said index keys conforming with the shape of said index grooves, to afford removable insertion of said control shaft into said limit washer;

a pair of equal lugs radiating from the circumference of said limit washer and symmetrically disposed to an intersecting common lug plane which also passes through the axis of said limit washer, the angular separation between the common lug plane and the common key plane being 45°, to provide for convertibility;

a pair of equal stops, projecting normal to the closed end of said cylindrical shell, standing diametrically opposed and lying just outside of the circumference of said limit washer, but standing inside the circular sweep of said lugs, to interfere with the travel of said lugs and to limit the rotation of said control shaft, the sum of the four angles subtended from the center of the valve cartridge to each lug and each stop being 180°, the free sweep angle of each individual said lug being 90°, limiting rotation of said rotor disk with respect to said stator disk to 90°, and providing full open or full closed operation at the extreme positions;

and whereby the cartridge valve may be converted from right-hand action to left-hand action by inverting the position of said limit washer, which inversion changes the position of said lug to said index key by 90°.

* * * * *